United States Patent [19]

Bhagwat et al.

[11] Patent Number: 4,893,067
[45] Date of Patent: Jan. 9, 1990

[54] DIRECT CURRENT MOTOR SPEED CONTROL

[75] Inventors: Pradeep Bhagwat, Baltimore, Md.; Duronie Harrell, Charlotte; Stephen Smith, Raleigh, both of N.C.; Samuel G. Woods, Baltimore, Md.

[73] Assignee: Black & Decker Inc., Newark, Del.

[21] Appl. No.: 47,181

[22] Filed: May 6, 1987

[51] Int. Cl.⁴ .............................................. G05B 5/00
[52] U.S. Cl. ....................................... 388/817; 388/812; 388/823; 388/901; 318/599; 307/353; 328/151
[58] Field of Search ............................. 318/331, 599; 388/800–901; 328/151; 307/352, 353

[56] References Cited

U.S. PATENT DOCUMENTS

| | | |
|---|---|---|
| 2,767,364 | 5/1955 | Guggi . |
| 3,027,505 | 3/1962 | Auld, Jr. .............................. 318/331 |
| 3,223,912 | 1/1964 | Sheheen . |
| 3,234,447 | 2/1966 | Sauber . |
| 3,260,912 | 7/1966 | Gregory . |
| 3,474,259 | 10/1969 | Rodgers .......................... 307/246 X |
| 3,504,260 | 3/1970 | Staples .............................. 318/331 |
| 3,586,948 | 6/1971 | Broome . |
| 3,586,949 | 6/1971 | Spear . |
| 3,683,253 | 8/1972 | Rummel et al. ...................... 318/331 |
| 3,727,120 | 4/1973 | Jewell et al. . |
| 3,838,324 | 9/1974 | Watanabe . |
| 3,855,511 | 12/1974 | Smith . |
| 3,900,781 | 8/1975 | Smith et al. . |
| 4,074,175 | 2/1978 | Born et al. . |
| 4,079,301 | 3/1978 | Johnson, III ..................... 318/331 X |
| 4,090,116 | 5/1978 | Lippitt ................................. 388/810 |
| 4,119,898 | 10/1978 | Morton et al. ................. 318/331 X |
| 4,177,412 | 12/1979 | Minakuchi ....................... 318/331 X |
| 4,180,767 | 12/1979 | Risberg . |
| 4,201,936 | 5/1980 | Roumanis . |
| 4,217,526 | 8/1980 | Farr . |
| 4,241,299 | 12/1980 | Bertone .......................... 318/331 X |
| 4,368,411 | 1/1983 | Kidd . |
| 4,389,990 | 6/1983 | Murray . |
| 4,418,298 | 11/1983 | Suzuki et al. . |
| 4,427,931 | 1/1984 | Tsukihashi . |
| 4,481,448 | 11/1984 | Bishop ........................ 318/345 D X |
| 4,523,134 | 6/1985 | Kinoshita et al. . |
| 4,562,393 | 12/1985 | Loyzim et al. . |
| 4,730,149 | 3/1988 | Zeitvogel ....................... 318/331 X |
| 4,803,410 | 2/1989 | Shinohara et al. ................. 388/817 |

FOREIGN PATENT DOCUMENTS 3328236  3/1974  Fed. Rep. of Germany .

OTHER PUBLICATIONS

Schematic Diagram XC-H VSDC X9.6 VSW, Nov. 1986.
Japan Patent Abstract, vol. 8, No. 231, Oct. 24, 1984, No. 59-113781, Sanyo Kenki K.K., Jun. 30, 1984.
Japan Patent Abstract, vol. 10, No. 205, Jul. 17, 1986, No. 61-46187, Hitachi Koki Co. Ltd., Mar. 6, 1986.
"Constant-Speed DC Motor Controller Using Power MOSFETs", Courtesy of Siliconix Incorporated, 1982.

Primary Examiner—William M. Shoop, Jr.
Assistant Examiner—Paul Ip
Attorney, Agent, or Firm—Harness, Dickey & Pierce

[57] ABSTRACT

The motor speed control circuit senses average back EMF as a measure of motor speed. The back EMF charges a capacitor circuit which accumulates charge and develops a voltage indicative of the motor speed. A sample and hold circuit may be used to sample the back EMF when the motor is switched off during each cycle. This voltage is compared with a reference voltage indicative of the desired motor speed. An error signal is generated by comparing the desired speed with the actual speed and this error signal is used to generate a variable duty cycle pulse train which gates the power controlling transistor on and off to control motor speed. A logic gated or SCR gated voltage boosting circuit operates in synchronism with the gating pulse train to drive the power transistor hard into saturation. This lowers the resistance of the power transistor, causing less energy dissipation as waste heat. The motor speed control circuit produces a family of torque-speed curves which maintain speed constant until a break point is reached, whereupon speed falls inversely proportional to torque. A torque control circuit monitors the motor current and maintains that current at a user selected level to thereby select a desired output torque.

14 Claims, 5 Drawing Sheets

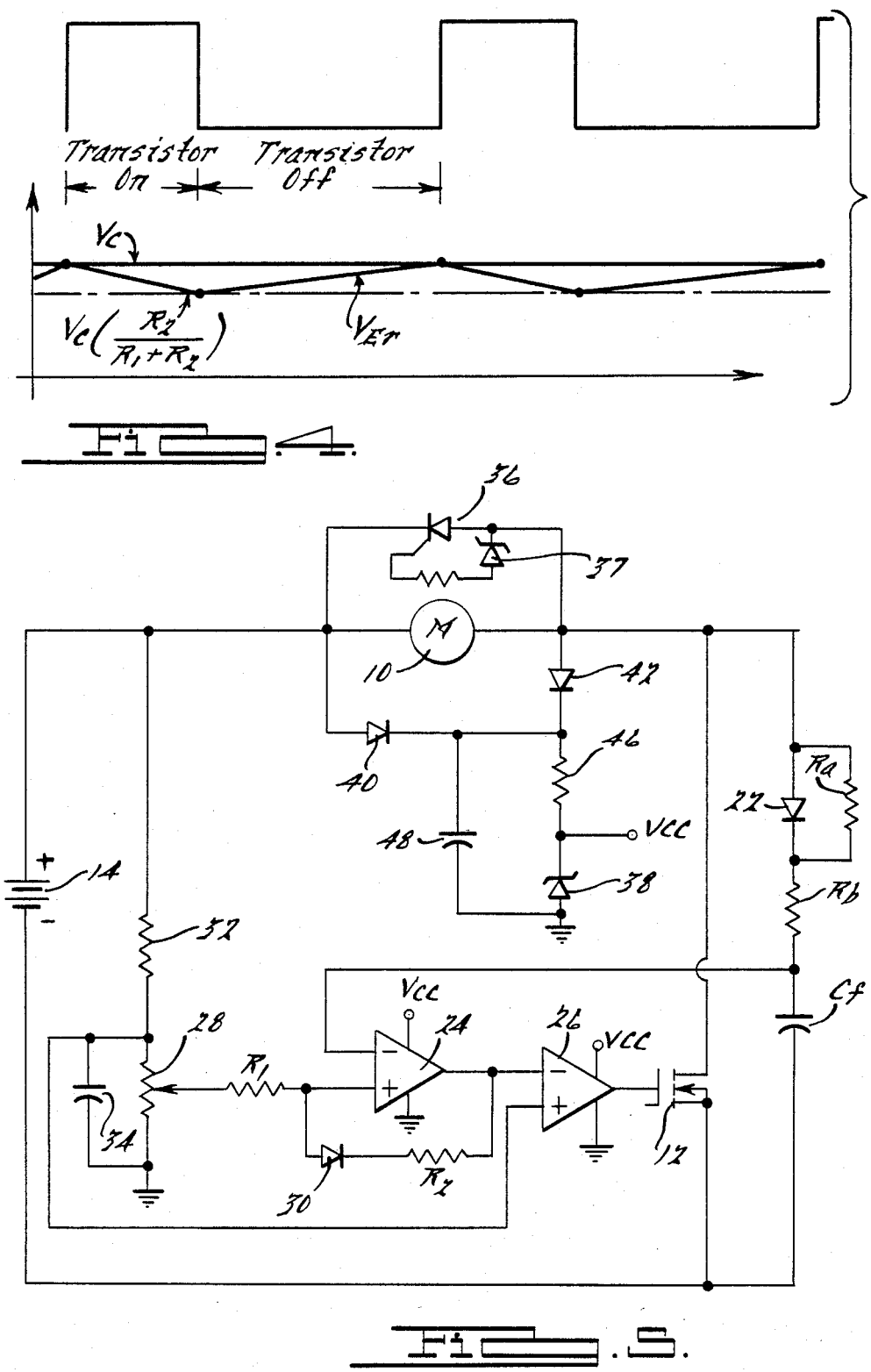

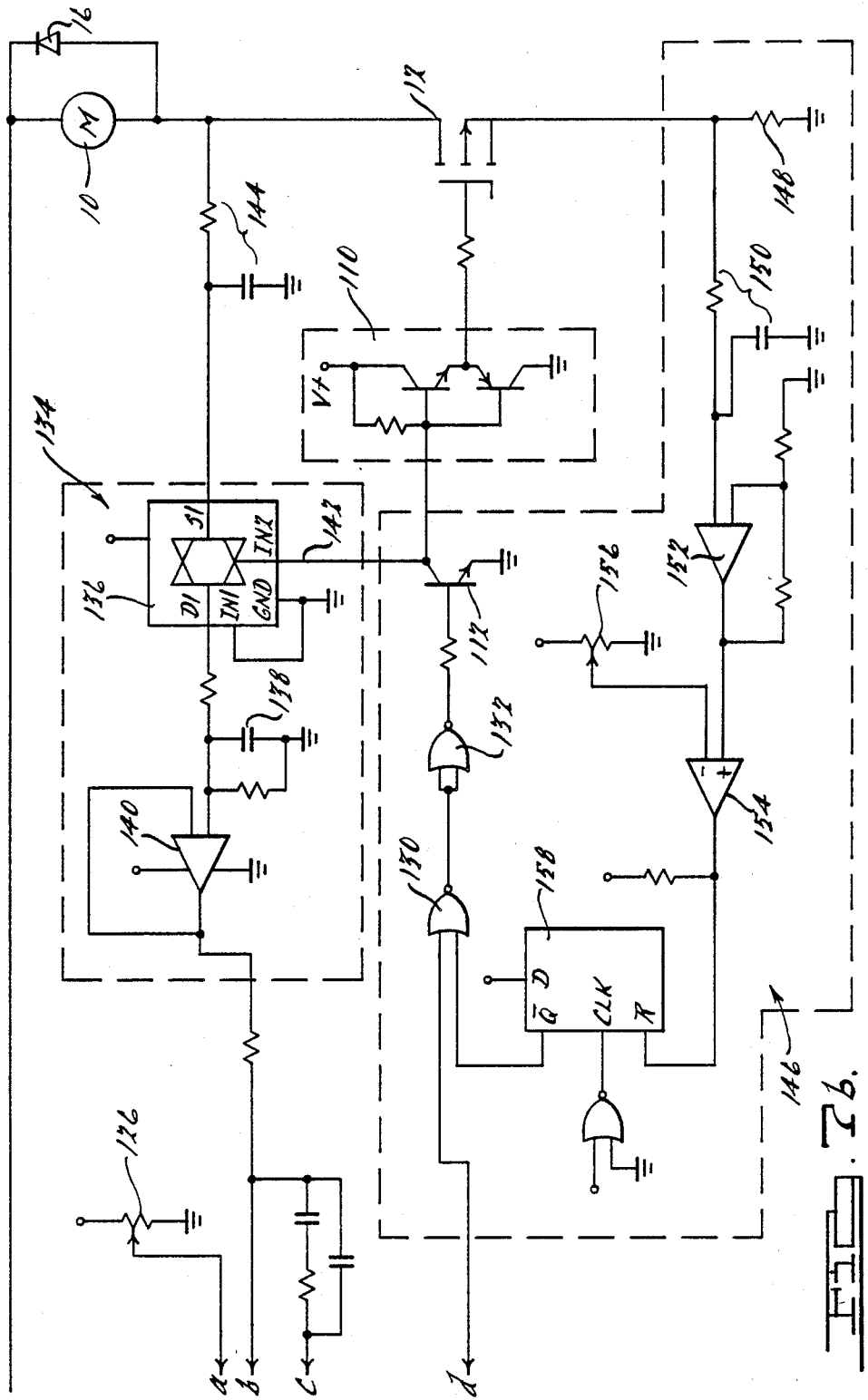

DIRECT CURRENT MOTOR SPEED CONTROL

BACKGROUND AND SUMMARY OF THE INVENTION

The present invention relates generally to motor speed control circuits. More particularly, the invention relates to a variable speed control circuit for use with direct current motors. The invention is thus applicable to DC powered and battery powered tools, appliances and other products employing DC motors.

The popularity of DC operated products such as hand-held power tools, appliances and the like has risen dramatically in recent years, owing in part to the improvements made in battery pack technology. DC operated products offer a great deal of convenience, since they can be used practically anywhere, without extension cords. Such products can also be readily adapted to work from an automotive power supply, adding even more versatility.

To enhance their usefulness, many products are equipped with some form of motor speed control circuit which allows the user to select the appropriate motor speed for the particular application. Conventional motor speed control circuits have proven generally effective in AC powered products but leave much to be desired when applied to DC powered products.

The present invention provides a much improved motor speed control circuit for providing variable speed with feedback in DC powered products. The control circuit switches the voltage to the motor off and on at a preset period to vary the motor speed. By increasing the on time duration and reducing the off time duration, the motor speed will increase. In a like fashion, if the on time is reduced and the off time increased, the motor speed will decrease. The invention thus can employ pulse width modulation. The control circuit which switches motor current on and off is interposed in the ground side or low side of the motor, rather than in the high side between the motor and the power source.

In hand-held products the switch position can be made to correspond to a desired speed. During the motor off time, the motor generates a back EMF voltage which is directly proportional to the motor speed. The circuit detects this voltage and compares it with a set voltage which corresponds to the switch position. If the motor back EMF voltage is low in relation to the switch position, the circuit increases the pulse width duty cycle in order to increase motor speed and, in turn, increase the back EMF voltage to balance the circuit.

The invention employs indirect sensing of the back EMF and controls the back EMF by closed loop control. In one embodiment, a capacitor coupled to the ground side of the motor (i.e., downstream of the power supply) accumulates a charge induced by the back EMF. The charge develops a voltage in a 1—$\}$ relationship to the average back EMF. The closed loop control may be either constant frequency variable on/off, or variable frequency constant on time control. The invention employs a charge pump circuit which permits operation from low battery voltages and which operates the motor controlling power transistor in an optimum fashion.

The invention enjoys a substantially reduced hardware cost by eliminating many expensive components. The circuit is a universal control which can be used on a wide variety of DC powered products. The control circuit offers a wide range of speed control and works very well in battery powered or DC powered applications.

For a more complete understanding of the invention, its objects and advantages, reference may be had to the following specification and to the accompanying drawings.

BRIEF DESCRIPTION OF THE DRAWINGS

FIG. 4 is a graph depicting the timing sequence of the invention;

FIG. 5 is a schematic diagram of one embodiment of the invention;

FIGS. 7a and 7b are a schematic diagram of yet another embodiment of the invention.

DESCRIPTION OF THE PREFERRED EMBODIMENTS

Figure 1:
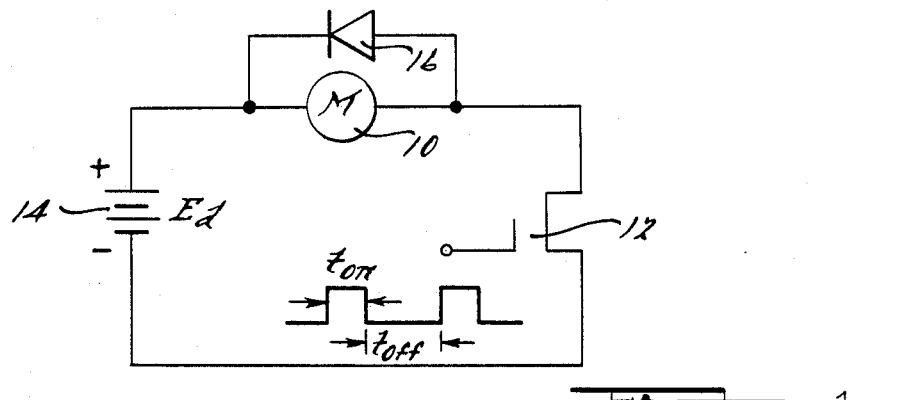
FIGS. 1–3 are schematic circuit diagrams useful in understand the principles of the invention.

Before a detailed description of the presently preferred embodiments is given, a brief explanation of certain principles of the invention will be given. Referring first to FIG. 1, DC motor 10 is depicted in a control circuit comprising field effect transistor (FET) 12, battery supply 14 and diode 16. Battery 14 may be any constant voltage source such as a battery pack or automotive supply or DC power supply. Efficient speed regulation of motor 10 can be achieved by chopping the voltage to the motor. This is done by controlling the on/off time of transistor 12 in order to vary the average voltage supplied to the motor. The average motor voltage is given by equation (1) below.

$$Vav = Ed \frac{ton}{ton + toff} \quad (1)$$

The invention can employ one or two types of duty cycle control, constant on time variable frequency control and constant frequency variable on time control. Constant on time variable frequency control provides very cost effective motor speed control and results in better speed regulation than can be achieved using conventional open loop control. This type of control gives particularly good performance at low motor speeds. Constant frequency variable on time control may be used where very precise speed control is required or where a very wide speed range is required. Unless otherwise indicated, the principles of the invention can be practiced with either type of duty cycle control. The invention functions well over a wide voltage range and gives good performance even at low voltages. It is thus useful in battery operated circuits, such as NiCad or sealed lead acid battery operated circuits, in which the battery voltage changes as the battery discharges from a fully charged state to a discharged state.

Figure 2:
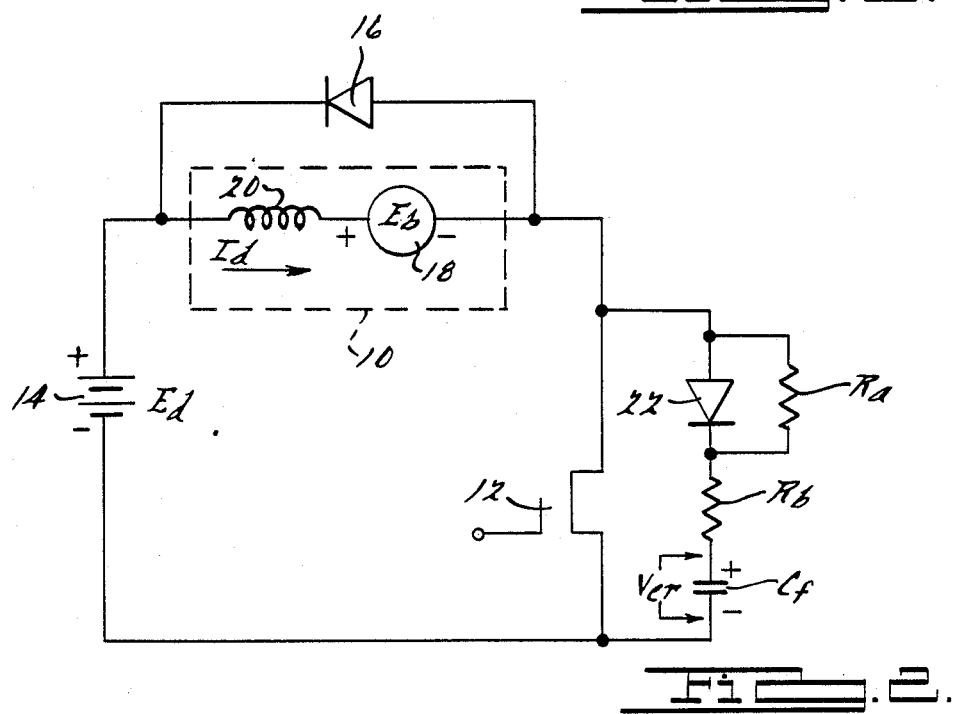

Referring now to FIG. 2, motor 10 has been represented by its equivalent circuit model, an EMF voltage source 18 in series with inductance 20. Coupled across the source and drain terminals of transistor 12 is a control circuit comprising resistors Ra and Rb, capacitor Cf and diode 22.

When transistor 12 is on, the battery voltage Ed is applied across the motor terminals. When transistor 12 is off, the motor current Id decays to zero quickly and the voltage across capacitor Cf approaches or charges toward $VEr=Ed-Eb$. Since Ed is constant during a cycle, if VEr is maintained at a constant level, then Eb will be kept constant. With Eb kept constant, the motor speed is kept constant. Speed can be varied by controlling voltage VEr as set forth in equation (2).

$$VEr=Ed-Eb \qquad (2)$$

If VEr is high, nearly equal to Ed, the back EMF voltage Eb will be very low or nearly equal to zero. In this instance the motor speed will also be low. Conversely, if VEr is nearly equal to zero, the back EMF voltage Eb will be nearly equal to the battery voltage Ed and hence the motor speed will be high.

Figure 3:
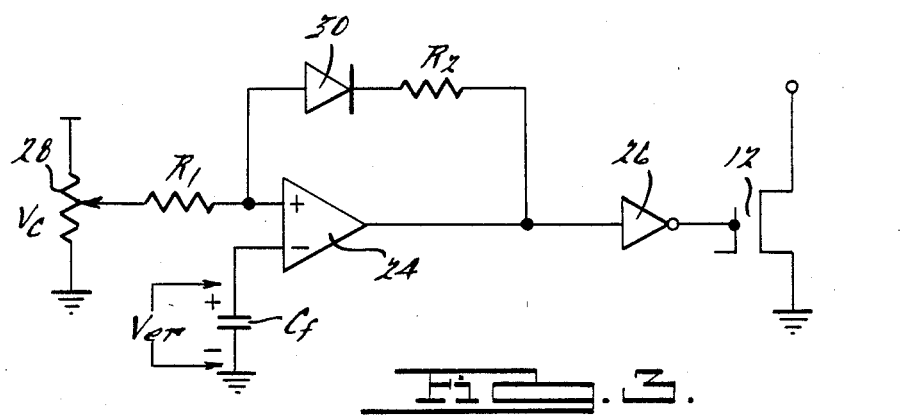

Resistors Ra and Rb and capacitor Cf are the components which control the frequency of operation by controlling the voltage ripple on the capacitor. The rate of operation is determined by rate of charge and discharge between the turn on and turn off threshold voltages. A control circuit for this purpose is illustrated in FIG. 3. Diode 16 and the winding resistance dissipate the inductive energy stored in the inductance of the motor represented by inductance 20.

Referring to FIG. 3, the control circuit comprises operational amplifier 24 and inverter 26. The control circuit is coupled to the gate of transistor 12 as illustrated. The inverting input of operational amplifier 24 is coupled to capacitor Cf and is thus responsive to the capacitor voltage VEr. The noninverting input of operational amplifier 24 is coupled to potentiometer 28 which provides a voltage reference. Resistors R1 and R2, together with diode 30, establish the hysteresis of operational amplifier 24 and establish closed loop control. Resistors Ra and Rb and Cf establish the stability of the system together with the motor inertia.

Operational amplifier 24 acts as a hysteresis voltage comparator. When transistor 12 is off, the output of operational amplifier 24 is high and hence the output of inverter 26 is low. In this state, the voltage across the input of operational amplifier 24 is the reference voltage Vc.

During this time, the voltage VEr across capacitor Cf is increasing to satisfy equation (2). When the voltage across capacitor Cf equals or exceeds the reference voltage Vc, operational amplifier 24 produces a low output which inverter 26 inverts to a high output. This in turn turns on transistor 12 and applies power to the motor. The voltage across the input of operational amplifier 24 is now a fraction of the reference voltage determined by the ratio of resistor R1 to resistor R2, $Vc\ R2/(R1+R2)$.

When transistor 12 is on, capacitor Cf starts discharging through resistors Ra and Rb. When voltage VEr discharges to or below the voltage across the input of operational amplifier 24 (i.e. equal to or below $Vc\ R2/(R1+R2)$) the operational amplifier produces a high output. Inverter 26 thus produces a low output which turns off transistor 12. In this fashion, the capacitor voltage VEr oscillates between voltage Vc and $Vc\ R2/(R1+R2)$. This is depicted in FIG. 4.

The above-described circuit effects a constant on time variable frequency motor speed control. This type of control is quite cost effective and gives good performance over a wide speed range. If more precise control is needed for a particular application, pulse width modulation control can be added to regulate capacitor voltage VEr thereby providing a constant frequency variable on time control.

Having thus described the fundamentals needed to understand the invention, several different preferred embodiments of a motor speed control will now be described.

Referring to FIG. 5, a motor speed control circuit suitable for use with DC operated products is illustrated. Some of the components of this circuit perform functions similar to the components of the circuits depicted in FIGS. 1-3. Where applicable, these components have been given like reference numerals. Accordingly, the motor speed control circuit of FIG. 5 includes a motor 10, field effect transistor 12 and battery 14. The control circuit likewise includes capacitor Cf with charging circuit comprising resistors Ra and Rb and diode 22. An operational amplifier 24 and inverter 26 are coupled to the transistor 12 generally as depicted in FIG. 3. Operational amplifier 24 operates in a closed loop fashion with bias resistor R1, feedback resistor R2 and diode 30 establishing the hysteresis and providing the feedback path. A reference voltage is supplied to operational amplifier 24 by potentiometer 28. Potentiometer 28 is connected to battery supply 14 via resistor 32. A storage capacitor 34 coupled across the potentiometer 28 completes the reference voltage circuit.

Motor 10 is provided with a self-triggered silicon controlled rectifier circuit 36, which initially remains off when the FET 12 is first switched off, allowing inductive energy stored in the motor to charge capacitor 48. When the SCR switching threshold, as established by Zener diode 37, is reached, the SCR turns on to dissipate any remaining inductive energy in a fashion similar to the operation of diode 16 of FIGS. 1 and 2. The charge on capacitor 48 serves as a voltage booster circuit, raising the gate drive voltage on the FET 12 allowing it to be driven hard into saturation when later switched on. This keeps the conductance of the FET high for minimal heat build up. A supply voltage VCC, needed to energize operational amplifier 24 and inverter 26, is provided by the voltage regulating circuit comprising Zener diode 38, diodes 40 and 42, resistor 46 and capacitor 48.

In operation, the circuit of FIG. 5 operates substantially as described in connection with FIGS. 1, 2 and 3. Transistor 12 is switched on and off in accordance with the charging and discharging of capacitor Cf.

Figure 6:
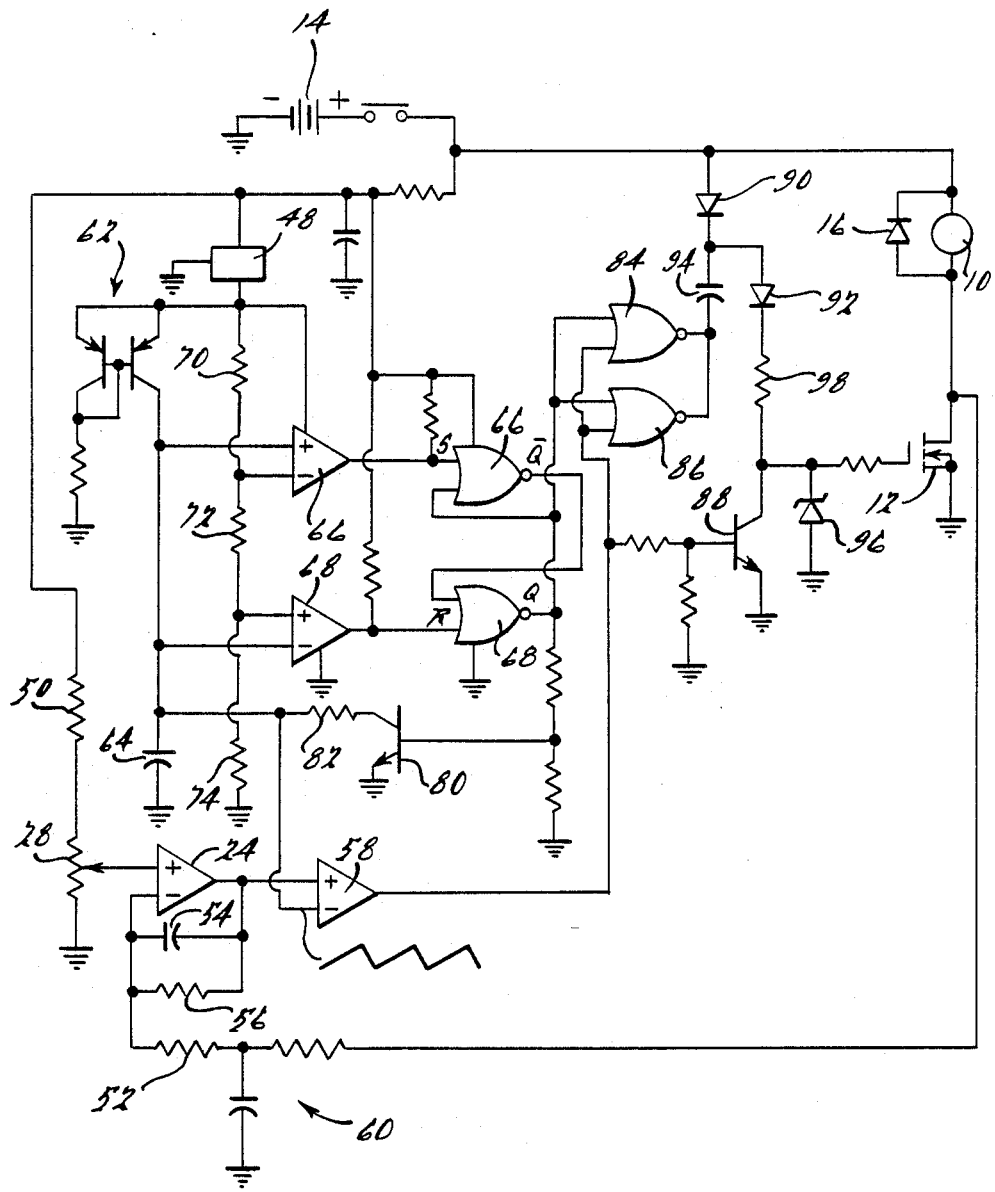
FIG. 6 is a schematic diagram of another embodiment of the invention.

An alternative embodiment of the motor speed control circuit as illustrated in FIG. 6. Where applicable, like components have been given like reference numerals. Accordingly, the motor speed control circuit of FIG. 6 includes motor 10 with diode 16 attached, field effect transistor 12 and battery supply 14. Potentiometer 28 provides an adjustable voltage reference which is applied to the noninverting input of operational amplifier 24. Potentiometer 28 is coupled to a voltage regulator via resistor 50. Preferably voltage regulator 48 delivers 5 volts DC. The inverting input of operational amplifier 24 is coupled through resistor 52 to the motor 10 to develop a feedback signal in a $1-\chi$ relationship to the back EMF of the motor and hence indicative of the motor speed. Operational amplifier 24 is configured as an integrating or averaging amplifier, employing a capacitor 54 in parallel with the feedback resistor 56. The output of operational amplifier 24 is coupled to the noninverting input of comparator 58. The inverting input of comparator 58 is connected to a ramp generating circuit which will be discussed more fully below. A spike filter capacitor and resistor 60 protects the input of operational amplifier 24 from spikes. The output of operational amplifier 24 can be considered as an average error signal for average difference between the actual motor speed and the desired speed set by the speed adjustment potentiometer 28. It will be understood that potentiometer 28 can be incorporated into the switch of a hand-held tool or appliance, if desired.

The ramp generating circuit comprises a pair of back-to-back transistors which operate as a constant current source for charging capacitor 64. A pair of comparators 66 and 68 are connected as shown to selected points along a resistor divider string comprising resistors 70, 72 and 74. The resistor divider string is connected to voltage regulator 48. Assuming voltage regulator 48 to produce a 5 volt DC output, then the voltage at the inverting input of comparator 66 is on the order of $3\frac{1}{3}$ volts, while the voltage on the noninverting input of comparator 68 is on the order of $1\frac{2}{3}$ volts. The noninverting input of comparator 66 and the inverting input of comparator 68 are both coupled to sense the voltage on capacitor 64. The outputs of comparators 66 and 68 are coupled to NOR gates 66 and 68 which are configured as an RS flip-flop. For convenience, the inputs of NOR gates 66 and 68 have been designated S for the set terminal and R for the reset terminal. The outputs have been designated Q and Q NOT. The flip-flop operates essentially as follows. If the S input goes high then the Q output goes high and the Q NOT output goes low. If the R input goes high the Q output goes low and the Q NOT output goes high. If both S and R terminals are low the outputs stay the same. Having both the S and R terminals high at the same time is a disallowed condition.

The charging and discharging of capacitor 64 is switched by transistor 80. Transistor 80 is responsive to the Q terminal of the flip-flop circuit. When the Q terminal is high, transistor 80 is switched on allowing capacitor 64 to discharge through resistor 82. When the Q terminal is low, transistor 80 is switched off, allowing capacitor 64 to be charged via the constant current source 62. The comparators 66 and 68 monitor the voltage on capacitor 64. When capacitor 64 charges to approximately $3\frac{1}{3}$ volts, comparator 66 fires, thereby driving the S terminal of the flip-flop circuit high. When this occurs transistor 80 is switched and capacitor 64 begins to discharge. When the voltage on capacitor 64 drops to $1\frac{2}{3}$ volts, comparator 68 fires and the R terminal of the flip-flop circuit is driven high. This resets the flip-flop circuit, turning off transistor 80 and allowing capacitor 64 to begin charging once again.

The ramp circuit, thus described, produces a sawtooth waveform which is applied to the inverting input of comparator 58. The output of comparator 58 is thus a comparison of this sawtooth waveform with the error signal generated by operational amplifier 24. The output of comparator 58 is conditioned by a pair of NOR gates 84 and 86 which are connected in parallel to increase the current source/sink capacity of these gates. The other inputs of NOR gates 84 and 86 are tied to the Q output of the flip-flop circuit. The output of comparator 58 is a pulse train of constant frequency variable duty cycle. The Q output is a pulse train of constant frequency, constant duty cycle. When these two signals are applied to NOR gates 84 and 86, the resulting output is a pulse train of constant frequency and variable duty cycle. The output of comparator 58 is fed to the base of switching transistor 88. The output of NOR gates 84 and 86 is fed to the collector of transistor 88. When transistor 88 is switched on, the gate of field effect transistor 12 is pulled to ground, or switched off. When transistor 88 is switched off current flows through diodes 90 and 92, turning field effect transistor 12 on. Hence the current through field effect transistor 12 will pulse on and off at a constant frequency, variable duty cycle, depending on the switching signal provided by comparator 58 and switching transistor 88.

The field effect transistor bias circuit includes a voltage boosting circuit comprising diodes 90 and 92, capacitor 94 and Zener diode 96. When NOR gates 84 and 86 are low, capacitor 94 charges through diode 90. When the NOR gates are switched high, capacitor 94 dumps its charge through diode 92 and resistor 98, thereby momentarily boosting the voltage applied to the gate of field effect transistor 12. Zener diode 96 clamps this voltage to nominally 15 volts. NOR gates 84 and 86 switch on and off at the same frequency as the driving signal from comparator 58. Generally the charging of capacitor 94 occurs during the interval when field effect transistor 12 is gated off, and capacitor 94 discharges generally during the interval when field effect transistor is switched on. The boosting circuit insures that the field effect transistor is switched on hard into saturation. This insures that the field effect resistance is low during on time, which prevents the motor current flowing through field effect transistor 12 from heating up that transistor.

The motor speed control circuits described above use the average of the back EMF signal as a feedback signal indicating motor speed. The control circuits maintain constant voltage across the motor, as opposed to merely maintaining a constant speed. This allows the motor to operate along multiple speed torque curve, as opposed to a single or constant speed torque curve. This has the benefit of providing perceptible feedback to the user. If, for example, a duty cycle of twenty percent (20%) is selected by a given speed switch setting and the motor is loaded, the speed control circuit will increase to a maximum of sixty percent (60%) duty cycle (3:1) before the speed will drop. For any given switch setting (speed selection setting) the speed is substantially constant until the load or torque required exceeds a break point. When the break point is reached the speed falls in a generally inverse relationship to the increasing torque. This family of curves has the advantage of preventing the motor from attempting to maintain a constant speed at high torque levels. This is particularly important at low motor speeds at which the motor cooling fan may not be moving enough air to dissipate the heat developed.

Figure 7A:
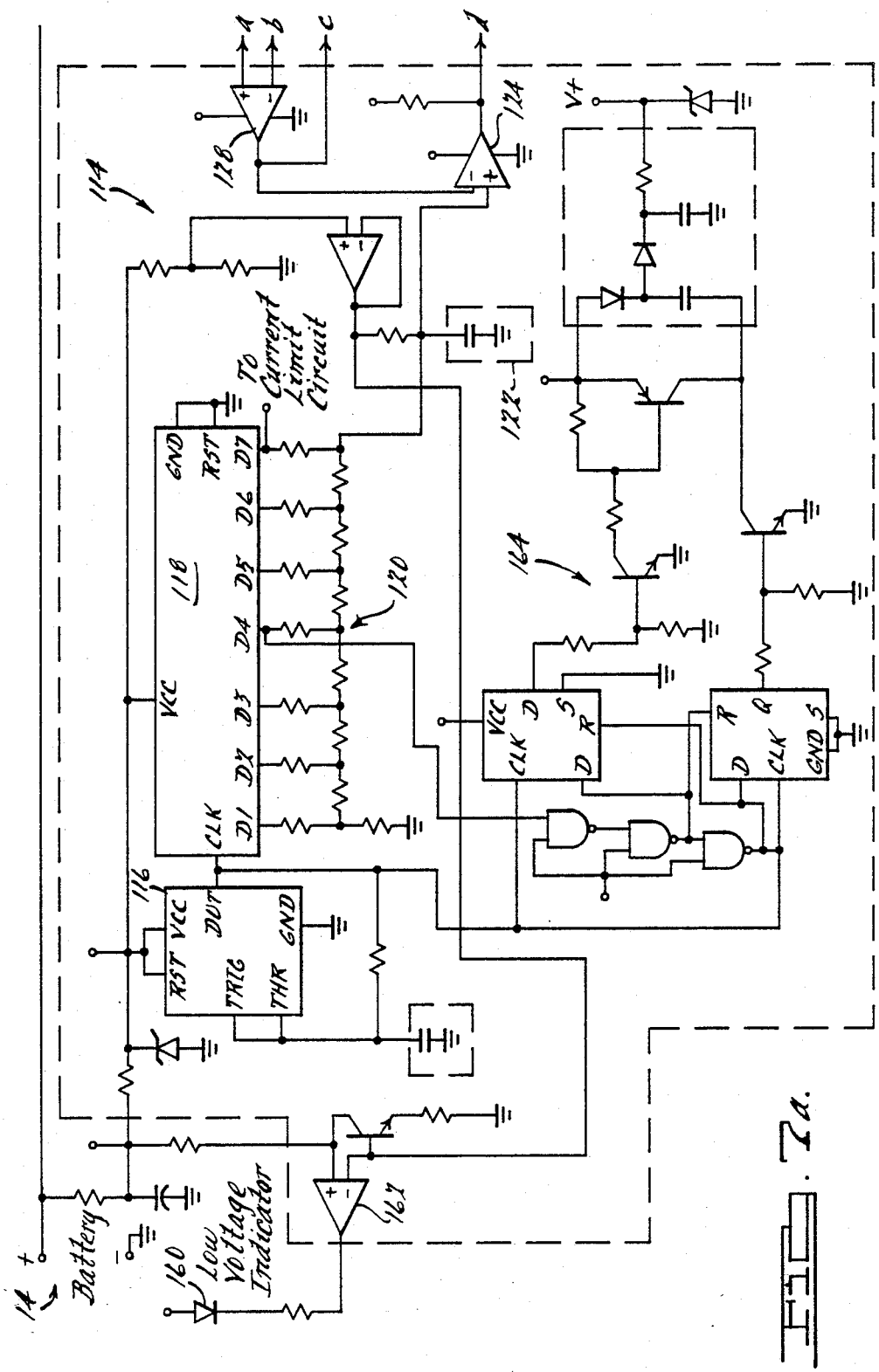

In another embodiment of the invention, depicted in FIGS. 7a and 7b, the motor speed is based on periodically sampled back EMF instead of the average back EMF. The circuit uses a sample and hold circuit for this purpose. The motor speed control circuit of FIGS. 7a and 7b is particularly useful where accurate speed control is desired. The circuit of FIGS. 7a and 7b also provides torque limiting.

Turning now to FIGS. 7a and 7b, DC motor 10, power control field effect transistor 12 and battery supply 14 are illustrated. As before, a diode 16 is coupled across the motor terminals. The field effect transistor switches on and off, generally as previously described, in order to regulate the power delivered to the motor and thereby regulate the motor speed.

Field effect transistor 12 is driven by a push/pull transistor driver 110, which is in turn driven by transistor 112. The push/pull transistor driver 110 is a noninverting driver, thus when the output of the collector of transistor 112 is high, field effect transistor 12 is on and when the output of the collector of transistor 112 is low, the field effect transistor 12 is off.

Transistor 112 is gated on and off by control circuit 114, which is a PWM control circuit providing a variable duty cycle pulse train where the duty cycle controls the motor speed. Essentially, control circuit 114 functions similarly to the circuit heretofore described in connection with FIG. 6. A sawtooth waveform is generated and compared with a voltage level determined by a speed control potentiometer. Although there are many ways of implementing the variable duty cycle PWM control circuit, FIG. 7a illustrates a digital embodiment thereof. A timer circuit 116, such as a 555 integrated circuit, generates a clock pulse train which is fed to D-to-A converter composed of counter 118 and ladder network 120. Counter 118 is connected to a resistive ladder circuit 120 and generates a stairstep waveform which rises one step with each clock pulse for 128 consecutive steps and then drops rapidly to zero and the cycle repeats. The stairstep waveform is filtered by ramp filter capacitor 122, producing a smooth ramp or sawtooth waveform. The ramp waveform is nominally a 1 KHz linear ramp waveform which is fed to the noninverting input of duty cycle comparator 124. The inverting input of error amplifier 128 is derived from a user selected voltage indicative of desired motor speed. Motor speed control potentiometer 126 supplied the reference voltage.

In a hand-held power tool, the speed control potentiometer 126 may be coupled to the trigger of the tool, for example, in a hand-held mixer it may be a sliding thumb switch in the handle. Other types of appliances may use other types of switches or knobs.

As illustrated, the speed control potentiometer 126 is coupled to the noninverting input of error amplifier 128. The output of this amplifier is coupled to the inverting input of duty cycle comparator 124. The inverting terminal of amplifier 128 receives a signal which is indicative of actual motor speed. This signal, and its generation, are discussed below in more detail. In effect, the error amplifier 128 compares the desired motor speed with the actual motor speed and generates an error signal to effect PID control over motor speed. The output of amplifier 128 is essentially a voltage level indicative of the motor speed error. Comparator 124 converts this voltage level into a periodic pulse train of variable duty cycle. The frequency of this signal is determined by the frequency of the linear ramp waveform, while the duty cycle is determined by the error voltage level.

The variable duty cycle signal is fed through logic gates 130 and 132, yet to be discussed. The output of logic gate 132 is applied to the base of transistor 112 to deliver the gating signal to the field effect transistor driver circuitry.

The signal indicative of motor speed is based upon the back EMF of the motor, generally in accordance with the previous discussion. In this embodiment, however, instead of simply storing a charge indicative of average back EMF, the circuit employs a sample and hold circuit 134 which samples the back EMF of motor 10 during the portion of the cycle when field effect transistor 12 is switched off. Circuit 134 holds the sampled value for the succeeding time during which the field effect transistor is switched on. The sample and hold circuit 134 comprises a electronic switching device 136 coupled to a holding capacitor 138 and buffer amplifier 140. The switching device 136 is illustrated in FIG. 7b as an analog switch having a gate terminal 142 connected to the collector of transistor 112. When the analog switch is gated on, holding capacitor 138 is effectively connected to RC filter network 144. The RC filter network is connected to motor 10 at the ground side of the motor, i.e., the motor is between the connection point and the battery. RC filter 144 senses the back EMF induced by the motor and provides a filtered back EMF signal to the electronic switching device 136. While switching device 136 has been illustrated as an analog switch, the invention may also be implemented using other types of electronic switches such as depletion mode MOSFET transistor gated by the collector of transistor 112.

The electronic switching device 136 is gated on (conductive) when field effect transistor 12 is off and is gated off (nonconductive) when the field effect transistor 12 is gated on. Due to the momentum in the motor armature, the motor keeps spinning when field effect transistor 12 is switched off. The back EMF signal generated by the spinning motor during this interval is fed through the electronic switching device 136 and stored in holding capacitor 138. The voltage developed on capacitor 138 is buffered through buffer amplifier 140. Buffer amplifier 140 provides a high impedance input to the capacitor and a low impedance output capable of driving the inverting input of error amplifier 128. Holding capacitor 138 thus holds the latest back EMF signal for use by the circuit as an indicator of motor speed.

One advantage of the sample and hold circuit is that it provides a more accurate measurement of back EMF. Without the sample and hold circuit, the signal sensed by the RC filter 144 will depend upon the duty cycle of the field effect transistor gating interval. If the duty cycle is short, i.e., if the field effect transistor is on for only a short period of time, the RC filter 144 is pulled to ground for only a short time and is allowed to sense the back EMF for a comparatively long time. Thus, for short duty cycles, the filter 144 would sense a signal quite close to the actual back EMF signal. On the contrary, at high duty cycles, the RC filter 144 is pulled to ground for a comparatively long time. The RC filter network, being an integrator, gives a measure of back EMF which is considerably lower than the actual back EMF. At a fifty percent (50%) duty cycle, for example, the RC filter 144 would sense the average of the back EMF and ground. Thus, without the sample and hold circuit, the measured back EMF is only accurate for lower duty cycles. Using the sample and hold circuit, motor speed can be accurately controlled even up to ninety-five percent (95%) to ninety-nine percent (99%) duty cycle.

The circuit of FIGS. 7a and 7b also employs a torque control circuit or current limiting circuit illustrated generally at 146. If the motor 10 is running at a constant speed, which the circuit of FIGS. 7a and 7b ensures, then the torque output of the motor is proportional to the power consumed by the motor. Power is in turn proportional to motor current, thus at constant speed, torque is proportional to motor current. The torque control circuit 146 senses the motor current and controls it in order to provide a constant torque output.

The torque control circuit comprises a current sensing resistor 148 which is in turn coupled through an RC filter 150 to a buffer amplifier 152. Notably, the current sensing resistor 148 is a very low resistance, less than 1

Ohm and preferably on the order of 0.010 Ohms. Motor current is a hand-held power tool, for example, can run in the range of 10 and 20 amps. Hence, a very low resistance current sensor is important in order to avoid undue heating of the sensor. Buffer amplifier 152 amplifies the current sensor signal by nominally a factor of 10, thus making the output of the current sensing resistor appear as if it is derived from a resistor of 10 times the resistance.

The output of buffer amplifier 152 is fed to the noninverting input of a comparator 154. The inverting input of comparator 154 receives a reference signal from current control potentiometer 156. The current control potentiometer may be available to the user of the tool for setting the desired torque output of the motor. Comparator 154 compares the desired current level with the actual current level and produces an error signal which is fed to the reset terminal R of latch 158. Latch 158 may be implemented using a flip-flop, for example, and latches off to maintain a fixed motor current. RC filter 150 eliminates any current spikes caused by ringing in the field effect transistor upon turn on or caused by capacitive currents in the motor windings. When latch 158 is reset, the field effect transistor 12 is turned off.

In use, the operator of the tool will set the desired torque by adjusting the current control potentiometer 156. The operator then uses the tool as normal by selecting the desired motor speed via the speed control potentiometer 126 driven by the tool trigger. As described, the circuit will maintain a constant speed based on the periodically sampled back EMF of the motor. If the motor current reaches the level set by the current control potentiometer, latch 158 is reset, restricting further power flow to the motor. Thus, the torque control circuit 146 effects a cycle by cycle current limiter for providing torque control. This feature is particularly advantageous in certain applications, such as in a motorized screw driver or power drill for driving dry wall screws. The appropriate speed can be selected by the user for driving the screw at a comfortable rate. The torque control ensures that all screws will be driven to the same depth by regulating the available torque available for the job.

For convenience, the circuit of FIG. 7a is provided with a low battery voltage indicator 160 in the form of a light emitting diode driven by comparator 162. The comparator senses the battery voltage and compares it with a reference voltage for the purpose of lighting the low voltage indicator when the battery needs to be recharged or replaced.

In addition, the circuit also includes a voltage doubler circuit 164, generally in accordance with the voltage double circuit described in connection with FIG. 6. The output of the voltage doubler circuit 164 is indicated as V+, and it will be seen that this output is applied to the push/pull driver 110 in order to ensure that the field effect transistor 12 is driven into hard saturation for good conductance of the comparatively heavy motor currents.

Although a digital implementation of a ramp generating circuit has been illustrated in FIG. 7a, the invention may also be implemented using comparable analog circuits. In practice, many of the components of the motor speed control circuit may be embodied in an integrated circuit for size reduction and cost savings. While in some of the above examples the invention has been described in conjunction with hand-held power tools and applicances such as electric drills or hand-held mixers, the invention can be applied to other uses as well and these other uses are contemplated. The circuit of the invention is capable of being used in a large number of different applications which are contemplated to be within the scope of the invention as set forth in the appended claims.

From the foregoing it will be understood that the motor speed control circuit of the invention can be implemented in both constant on time variable frequency control and constant frequency variable on time or duty cycle control. The former circuit is exemplified by FIG. 5 and the latter circuit by circuit 6. While the invention has been described in connection with its presently preferred embodiments, it will be understood that the invention is capable of certain modification and change without departing from the spirit of the invention as set forth in the appended claims.

What is claimed is:

1. A DC motor speed control circuit comprising:
   a DC motor inducing a back EMF;
   a sample and hold means coupled to said motor for developing a signal having a $1-\chi$ relationship to the back EMF of said motor where is $\chi$ the back EMF;
   a means for measuring and comparing said developed signal with a predetermined reference signal indicative of the desired motor speed;
   a means for producing a gating signal indicative of the relationship of said developed signal to said reference signal;
   a gated control means coupled to regulate electrical power to said motor; said control means being responsive to said gating signal to permit power flow to said motor when said developed signal is at one relationship to said reference signal and to restrict power flow to said motor when said developed signal is at a second relationship to said reference signal.

2. The circuit of claim 1 wherein said sample and hold means is coupled to said means for producing a gating signal and said sample and hold means is gated by said gating signal to sample said back EMF of said motor when said power flow to said motor is restricted and to hold the sampled back EMF when said power flow to said motor is permitted.

3. The circuit of claim 1 wherein said sample and hold means comprises an electronic switching means coupled to said motor and having a gating terminal coupled to said means for producing a gating signal and further comprises energy storage means coupled to said electronic switching means for storing a back EMF signal.

4. The circuit of claim 3 wherein said sample and hold means further comprises buffer amplifier coupled to said energy storage means for coupling to said means for measuring and comparing.

5. A DC motor speed control circuit comprising:
   a DC motor inducing a back EMF;
   an energy storage means coupled to said motor for developing a signal indicative of the back EMF of said motor;
   a means for measuring and comparing said developed signal with a predetermined reference signal indicative of desired motor speed;
   a means for producing a first gating signal indicative of the relationship of said developed signal to said reference signal;
   a gated control means coupled to regulate electrical power to said motor; said control means being responsive to said first gating signal to permit power flow to said motor when said developed signal is at one relationship to said reference signal and to restrict power flow to said motor when said developed signal is at a second relationship to said reference signal;

a means for sensing current flow through said motor and for providing a current level signal;

a means for comparing said current level signal to a second predetermined reference signal indicative of desired motor torque;

a means for producing a second gating signal indicative of the relationship of said current level signal to said second reference signal;

said gated control means being responsive to said second gating signal to regulate power flow to said motor in response to said current flow through said motor to thereby control the torque output of said motor.

6. The circuit of claim 5 wherein said energy storage means comprises a capacitor.

7. The circuit of claim 5 wherein said energy storage means comprises a sample and hold means.

8. The circuit of claim 5 wherein said means for sensing current comprises low resistance means in series with said motor and an amplifier coupled to said low resistance means.

9. The circuit of claim 8 wherein said low resistance means has less than 1 Ohm of resistance.

10. The circuit of claim 5 wherein said second gating signal regulates power flow to said motor by limiting current flow through said motor on a cycle by cycle basis is synchronism with said first gating signal.

11. The circuit of claim 5 further comprising latch means responsive to said second gating signal and logic gating means coupled to said latch and receptive of said first gating signal for selectively decoupling said first gating signal in response to said second gating signal.

12. A DC motor speed control circuit comprising:

a DC motor having an operating current and inducing a back EMF;

a sample and hold means coupled to said motor for developing a signal indicative of the back EMF of said motor;

a means for measuring and comparing said developed signal with a predetermined reference signal indicative of desired motor speed;

a capacitor means charged by said operating current of said DC motor for producing a variable frequency gating signal wherein said frequency is indicative of the relationship of said developed signal to said reference signal; wherein said sample and hold means further comprises buffer amplifier coupled to said energy storage means for coupling to said means for measuring and comparing;

a gated control means coupled to regulate electrical power to said motor; said control means being responsive to said gating signal to permit power flow to said motor when said developed signal is at one relationship to said reference signal and to restrict power flow to said motor when said developed signal is at a second relationship to said reference signal.

13. The circuit of claim 12 wherein said sample and hold means is coupled to said means for producing a gating signal and said sample and hold means is gated by said gating signal to sample said back EMF of said motor when said power flow to said motor is restricted and to hold the sampled back EMF when said power flow to said motor is permitted.

14. The circuit of claim 12 wherein said sample and hold means comprises an electronic switching means coupled to said motor and having a gating terminal coupled to said means for producing a gating signal and further comprises energy storage means coupled to said electronic switching means for storing a back EMF signal.

* * * * *

UNITED STATES PATENT AND TRADEMARK OFFICE
CERTIFICATE OF CORRECTION

PATENT NO. : 4,893,067

DATED : January 9, 1990

INVENTOR(S) : Pradeep Bhagwat et al.

It is certified that error appears in the above-identified patent and that said Letters Patent is hereby corrected as shown below:

Column 1, line 57, "$\dagger$" should be --$\chi$--.

Column 4, line 47, "as" should be --is--.

Column 7, line 67, "a" should be --an--.

Column 9, line 2, "is" should be --in--.

Column 9, line 3, "and" should be --to--.

Column 11, line 33, claim 10, "is" should be --in--.

Signed and Sealed this

Nineteenth Day of March, 1991

Attest:

HARRY F. MANBECK, JR.

*Attesting Officer*     *Commissioner of Patents and Trademarks*